Patented Dec. 19, 1933

1,940,396

UNITED STATES PATENT OFFICE 1,940,396

PROCESS FOR BREAKING PETROLEUM EMULSIONS

Melvin De Groote, St. Louis, Mo., assignor to Tretolite Company, Webster Groves, Mo., a corporation of Missouri No Drawing. Application January 21, 1933
Serial No. 652,946

5 Claims. (Cl. 196—4)

This invention relates to the treatment of emulsions of mineral oil and water, such as petroleum emulsions, for the purpose of separating the oil from the water.

Petroleum emulsions are of the water-in-oil type, and comprise fine droplets of naturally-occurring waters or brines, dispersed in a more or less permanent state throughout the oil which constitutes the continuous phase of the emulsion. They are obtained from producing wells and from the bottoms of oil storage tanks, and are commonly referred to as "cut oil", "roily oil", "emulsified oil" and "bottom settlings".

The object of my invention is to provide a novel, inexpensive and efficient process for separating emulsions of the kind referred to into their component parts of oil and water or brine.

Briefly described, my process consists in subjecting a petroleum emulsion of the water-in-oil type, to the action of a treating agent or demulsifying agent of a particular composition hereinafter described, thereby causing the emulsion to break down and separate into its component parts of oil and water or brine, when the emulsion is permitted to remain in a quiescent state after such treatment.

Various classes of materials have heretofore been used or suggested as demulsifying agents in the resolution of petroleum emulsions, such as water softeners, modified fatty acids, hydroxy aromatics, various non-fatty sulfonic acids, etc. Mixtures of materials of the kind above mentioned also have been used or suggested, sometimes with improved results and sometimes with inferior results. Generally, when various classes of materials are efficient demulsifiers, mixtures of such materials are also efficient demulsifiers, provided that the materials constituting a mixture are not incompatible, but the value or effectiveness of a mixture produced by combining a known demulsifier selected from one class, with another known demulsifier selected from a different class, can easily be determined by simple routine chemical experimentation involving only chemical skill or knowledge, as distinguished from inventive ability. There have been instances where particular petroleum emulsions or particular types of emulsion would not respond to treatment with the individual members of a class or classes of demulsifiers, or with mixtures produced from selected members of two different classes of known demulsifiers and when such emulsions are encountered, inventive ability is often required to produce a demulsifying agent that will successfully "break" or treat the emulsion under consideration. An example of a demulsifying agent of the kind last referred to is the one described in U. S. Patent No. 1,659,998, to Keiser, dated February 21, 1928, which demulsifying agent consists of a mixture of previously known demulsifiers, combined in certain specific proportions.

The treating agent or demulsifying agent contemplated by our process is of the kind that is composed of a mixture of materials, but it is also that particular type of mixture which is characterized by great specificity, both in the substances of which it is composed, and in the quantities or proportions of said substances. It consists of or comprises water-soluble, oil-insoluble sulfonic acids or salts thereof derived from petroleum, mixed with naphthenic acids or salts thereof, of the kind described in the co-pending application of De Groote et al. Serial No. 652,941, filed Jan. 21, 1933, the said mixture being oil-soluble.

The use of the salts of petroleum sulfonic acids or the acids themselves for demulsification of crude oil is well known. The variation in character, particularly in regard to oil and water-acter, particularly in regard to oil and water-solubility, of the petroleum sulfonic acids or their alkali salts is also well known. The parent material of any petroleum sulfonic acid is, of course, a naturally-occurring petroleum body, and the particular petroleum body which serves as the parent material may vary in regard to molecular weight or may vary in regard to structure. When a sulfo group is introduced into a petroleum body, it may or may not confer upon the compound water-solubility, and likewise, it may or may not eliminate oil-solubility. For instance, if a sulfo group is introduced into a high molecular weight petroleum body, the single sulfo group may not be sufficient to confer water solubility upon the compound thus formed. On the other hand, the introduction of a sulfo group into a low molecular weight petroleum body may readily confer water-solubility upon the new compound, and may even eliminate oil-solubility. Thus, one may have petroleum sulfo acids which are distinctly water-soluble and substantially oil-insoluble. There may be others which are substantially oil-soluble and water-insoluble. There are still others which show both oil and water-solubility.

At the present time water soluble, oil-insoluble petroleum sulfonates are available substantially free from polymerized materials, such as polymerized olefines, and free from non-sulfo hydrocarbons, and containing approximately 35% of water. They are available in the form of an acid or in the form of a salt, such as the sodium or ammonium salt. The ammonium salt exhibits less viscosity in concentrated solution than the sodium or potassium salt, and generally is the most desirable form. Furthermore, many petroleum sulfonic acids or salts are generally accompanied by inorganic sulfates, such as sodium sulfate or ammonium sulfate as an inherent manufacturing impurity. The solubility of any inorganic salt, such as ammonium sulfate in the ammonium salt of water-soluble petroleum sulfonic acids is relatively high, and thus the preferred form is the ammonium salt. One may employ the sodium or potassium salt or might even react the sulfonic acid with a reactive hydroxy amine, which would act in the same manner as ammonium hydroxide. The advantage of a substantially uniform oil-soluble mixture of the kind contemplated by my process becomes obvious, when one considers lack of uniformity in ordinary oil-soluble sulfonic acids, especially the water-insoluble ones, together with their relative ineffectiveness when used alone, and also the stringiness produced by inorganic salts, if present in appreciable amounts.

If a petroleum product, particularly a lubricating oil stock derived from crude oil of the Gulf Coast of Texas, is treated with sulfuric acid, substantially all polymerized materials pass into the first acid draw-off. Indeed, those polymerized materials which do not pass into the first acid draw-off readily pass into the second acid draw-off. Therefore, such stock which has had a double acid treatment can be sulfonated further by repeated treatments with sulfuric acid or other suitable sulfonating agent to yield water soluble sulfonic acids substantially free from polymerized materials or any appreciable amount of non-sulfo type hydrocarbons. Such manufacturing procedure is conducted solely for the production of water-soluble sulfonic acids. There is no variation in the composition of the product beyond that of commercial tolerance. The material thus obtained is very similar in composition to oil-soluble sulfonic acids, but it is free from objectionable inorganic impurities and also free from unpreventable variations in composition. Such sulfonic acids are also available in the form of ammonium salts, which is not true of the ordinary by-product type of sulfonic acid which is usually available only as a sodium salt.

Although sludge acids or other salts, before or after purification, may be used, I have found that if such water-soluble, oil-insoluble sulfonic acids of the specific kind above described are mixed with naphthenic acids of the kind hereinafter specified, and then the naphthenic acids neutralized until oil-solubility is obtained, that the resulting mixture of water-soluble, oil-insoluble petroleum sulfo acids and naphthenic acids, have all the desirable physical characteristics of oil-soluble sulfonic acids for demulsification, and can replace oil-soluble sulfonic acids or their salts in various demulsifiers merely by substitution. Moreover, such a mixture has the inherent advantage that there is substantially no variation in composition, and there is no objectionable amount of inorganic salts, such as sodium sulfate or sodium sulfite present, and they really are effective demulsifiers and contribute more than oil-solubility alone.

The water-soluble, oil-insoluble sulfonic acids intended to be used as one ingredient of the demulsifying agent contemplated by my process may be in the form of a sodium salt, or the form of a potassium salt or ammonium salt, or combined with a suitable hydroxylated amine. The naphthenic acids intended to be used as the other ingredient of said demulsifying agent may be added in approximately an equal amount or in amount about one-half as much as the petroleum sulfonic acids, and then a suitable neutralizing agent may be added to the naphthenic acid mixture until it becomes substantially clear and exhibits oil-solubility, especially in a solution of fairly high concentration, such as 5 to 15%. In manufacturing or producing the mixture which constitutes my improved demulsifying agent, I prefer to use the ammonium salt of a water soluble sulfonic acid containing about 35% of water and mix therewith an equal weight of naphthenic acid, and then add strong ammonium hydroxide with constant stirring, until the mixture is clear and exhibits oil-solubility when approximately 25 parts of the mixture is added to approximately 75 parts of kerosene. It is obvious, of course, that the amount of water present also affects the oil-solubility. For instance, if caustic soda solution is used to neutralize the mixture, then the stronger the caustic soda solution, the smaller the percentage of water which is added to the mixture, and if the percentage of water is small, the oil-solubility tends to increase. Such mixtures exhibit water-solubility in addition to oil-solubility, and are excellent demulsifying agents alone, or when substituted for the ordinary oil-soluble, water-soluble sulfonic acid in various combinations.

The naphthenic acids intended to be used as one ingredient of the demulsifying agent contemplated by my process, are substantially the same as those described in co-pending application Serial No. 652,941, filed January 21, 1933, and have the following characteristics: The molecular weight should not be less than 200 and not over 575. The mean molecular weight preferably should be about 225. The distillation range should vary from approximately 230° C., to 310° C. A typical distillation range is shown in the following table:

| | |
|---|---|
| 10% | 230° C. |
| 20% | 255° C. |
| 30% | 268° C. |
| 40% | 273° C. |
| 50% | 278° C. |
| 60% | 279° C. |
| 70% | 287° C. |
| 80% | 290° C. |
| 85% | 292° C. |
| 100% | 310° C. |

These naphthenic acids should be soluble in 65% ethyl alcohol when 10% naphthenic acid is added, but it should be insoluble when only 5% is added. The selected naphthenic acids should show no substantial iodine number. When the iodine number determination is made by the Hübl-Waller method, they should not show an iodine number greater than 2 or 3. The saponification number should be in the neighborhood of 250. The specific gravity at 77° F. should be about 0.9635. Naphthenic acids of this description are commercially available, and one need only to make the proper selection to obtain a material of value. Reasonable variation from these specifications is permissible, but it should only be variation of the kind that one would expect in ordinary commercial products. If any marked deviation is made from the above mentioned characteristics of the naphthenic acids employed, it will be found that they are substantially worthless.

At the present time, certain petroleum emulsions are being treated with water-soluble, oil-soluble sulfonic acids or their salts, mixed with suitable solvents in amounts varying from 25 to 100% of the kind which have been in use for approximately a decade in conjunction with demulsifying agents, for instance, such solvents as water, kerosene, alcohol, etc. These reagents of the petroleum sulfonic acid type have not replaced the more widely used demulsifiers derived from fatty acids, probably because a wider variety of materials can be prepared from various fatty acids than can be prepared from petroleum sulfonic acids. In some cases, the presence of inorganic salts in petroleum sulfonic acids, as well as the unpreventable inherent variation in the composition of the water-soluble, oil-soluble type has prevented their wider adoption. I believe that the specific mixture herein described will tend to increase the adoption of petroleum acids or their salts for demulsification, but I do not contend that said mixture will supersede the majority of modified fatty acids, sulfated fatty acids, etc. heretofore used extensively as treating agents in the resolution of petroleum emulsions. It is probable that a demulsifying agent of the particular composition herein described will find rather limited application and only to an extent somewhat similar to that now enjoyed by oil-soluble, water-soluble sulfonic acids or their salts, but I believe that there may be instances in which such a demulsifying agent will be effective on petroleum emulsions that will not respond to treatment with oil-soluble, water-soluble sulfonic acids or their salts. Generally speaking, the advantage of the demulsifying agent herein described resides largely in its uniformity of composition and its freedom from inorganic salts, which permits it to be mixed with a variety of other demulsifiers without the presence of appreciable inactive non-sulfo type hydrocarbons, and without causing stringiness, and without causing precipitation of inorganic salts, and without repressing oil-solubility.

In practicing my process, a treating agent or demulsifying agent of the kind above described may be brought in contact with the emulsion to be treated in any of the numerous ways now employed in the treatment of petroleum emulsions of the water-in-oil type with chemical demulsifying agents, such, for example, as by introducing the treating agent into the well in which the emulsion is produced; introducing the treating agent into a conduit through which the emulsion is flowing; introducing the treating agent into a container that holds a sludge obtained from the bottom of an oil storage tank. In some instances, it may be advisable to introduce the treating agent into a producing well in such a way that it will become mixed with water and oil that are emerging from the surrounding strata, before said water and oil enter the barrel of the well pump or the tubing up through which said water and oil flow to the surface of the ground. After treatment, the emulsion is allowed to stand in a quiescent state, usually in a settling tank, and usually at a temperature varying from atmospheric temperature to about 200° F., so as to permit the water or brine to separate from the oil, it being preferable to keep the temperature low enough to prevent the volatilization of valuable constituents of the oil. If desired, the treated emulsion may be acted upon by one or more of the various kinds of apparatus now used in the operation of breaking petroleum emulsions, such as homogenizers, hay tanks, gun barrels, filters, centrifuges, or electrical dehydrators.

The amount of treating agent that may be required to break the emulsion may vary from approximately one part of treating agent to 500 parts of emulsion, up to one part of treating agent to 20,000, or even 30,000 parts of emulsion. The proportion depends on the type of emulsion being treated, and also upon the equipment being used, and the temperature employed. In treating exceptionally refractory emulsions of the kinds known as "tank bottoms" and "residual pit oils", the ratio of 1:500, above referred to, may be required. In treating fresh emulsions, i. e., emulsions that will yield readily to the action of chemical demulsifying agents, the ratio of 1:30,000, above referred to, may be sufficient to produce highly satisfactory results. In general, I have found that for an average petroleum emulsion, a ratio of 1 part of treating agent to 5,000 parts of emulsion will usually be found to produce commercially satisfactory results.

Having thus described my invention, what I claim as new and desire to secure by Letters Patent is:

1. A process for breaking petroleum emulsions of the water-in-oil type, which consists in subjecting the emulsion to the action of an oil-soluble demulsifying agent consisting of a mixture that comprises (1) a water-soluble, oil-insoluble petroleum sulfonic acid, free from polymers, and derived from Gulf Coast naphthene crude oil by multiple acid treatment of the kind in which the first acid draw-off is discarded, and (2) a naphthenic acid body selected from the class comprising acids and salts and produced from naphthenic acid having a molecular weight range of from 200 to 575, a mean molecular weight of approximately 225, and a distillation range of from 230° C. to 310° C.

2. A process for breaking petroleum emulsions of the water-in-oil type, which consists in subjecting the emulsion to the action of an oil-soluble demulsifying agent consisting of a mixture that comprises (1) an ammonium compound of a water-soluble, oil-insoluble petroleum sulfonic acid, free from polymers, derived from Gulf Coast naphthene crude oil by multiple acid treatment of the kind in which the first acid draw-off is discarded, and (2) a naphthenic acid body selected from the class comprising acids and salts and produced from naphthenic acid having a molecular weight range of from 200 to 575, a mean molecular weight of approximately 225, and a distillation range of from 230° C. to 310° C.

3. A process for breaking petroleum emulsions of the water-in-oil type, which consists in subjecting the emulsion to the action of an oil-soluble demulsifying agent consisting of a mixture that comprises (1) an ammonium compound of a water-soluble, oil-insoluble petroleum sulfonic acid substantially free from non-sulfo type hydrocarbons and derived from Gulf Coast naphthene crude oil by multiple acid treatment of the kind in which the first acid draw-off is discarded, and (2) a naphthenic acid body selected from the class comprising acids and salts and produced from naphthenic acid having a molecular weight range of from 200 to 575, a mean molecular weight of approximately 225, and a distillation range of from 230° C. to 310° C.

4. A process for breaking petroleum emulsions of the water-in-oil type, which consists in subjecting the emulsion to the action of an oil-soluble demulsifying agent consisting of a mixture that comprises (1) an ammonium compound of a water-soluble, oil-insoluble petroleum sulfonic acid containing not over 35% of water, being substantially free from polymers and non-sulfo type hydrocarbons and derived from Gulf Coast naphthene crude oil by multiple acid treatment of the kind in which the first acid draw-off is discarded, and (2) a naphthenic acid body comprising acids and salts and produced from naphthenic acid having a molecular weight range of from 200 to 575, a mean molecular weight of approximately 225, and a distillation range of from 230° C. to 310° C.

5. A process for breaking petroleum emulsions of the water-in-oil type, which consists in subjecting the emulsion to the action of an oil-soluble demulsifying agent consisting of a mixture that comprises (1) an ammonium compound of a water-soluble, oil-insoluble petroleum sulfonic acid containing not over 35% of water, being substantially free from polymers and non-sulfo type hydrocarbon and derived from Gulf Coast naphthene crude oil by multiple acid treatment of the kind in which the first acid draw-off is discarded, and (2) a naphthenic acid body comprising acids and salts and produced from naphthenic acid having a molecular weight range of from 200 to 575, a mean molecular weight of approximately 225, and a distillation range of from 230° C. to 310° C., said naphthenic acid body being diluted with less than an equal volume of kerosene.

MELVIN DE GROOTE.